United States Patent
Kong

(10) Patent No.: US 6,243,813 B1
(45) Date of Patent: Jun. 5, 2001

(54) METHOD OF DETACHING A SECURITY DEVICE FROM A PERSONAL COMPUTER

(75) Inventor: Won-keun Kong, Suwon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/056,827

(22) Filed: Apr. 8, 1998

Related U.S. Application Data

(62) Division of application No. 08/682,280, filed on Jul. 17, 1996, now Pat. No. 5,884,026.

(30) Foreign Application Priority Data

Jul. 28, 1995 (KR) .................................................. 95-22938

(51) Int. Cl.[7] .............................. G06F 12/14; H04L 9/32
(52) U.S. Cl. .......................... 713/193; 713/200; 713/202; 713/183
(58) Field of Search ................................... 713/193, 200, 713/202, 183

(56) References Cited

U.S. PATENT DOCUMENTS

| | | | |
|---|---|---|---|
| 4,951,279 | * 8/1990 | McClung et al. | 713/202 |
| 5,212,729 | * 5/1993 | Schafer | 705/55 |
| 5,327,497 | * 7/1994 | Mooney | 235/382 |
| 5,343,525 | * 8/1994 | Hung et al. | 713/193 |
| 5,535,409 | * 7/1996 | Larvoire et al. | 713/202 |
| 5,537,544 | * 7/1996 | Morisawa et al. | 713/202 |
| 5,828,831 | * 10/1998 | Kong | 713/200 |
| 5,884,026 | * 3/1999 | Kong | 713/202 |
| 6,069,953 | * 5/2000 | Kong | 713/193 |

* cited by examiner

Primary Examiner—Tod Swann
Assistant Examiner—Steve Kabakoff
(74) Attorney, Agent, or Firm—Sughrue, Mion, Zinn, Macpeak & Seas, PLLC

(57) ABSTRACT

A personal computer having a security function is provided. The computer includes an input/output device which inputs/outputs a password, a main memory which stores the password, a hard disk which stores the password and a boot sector without partition, which is booted in response to a booting permission signal, a security device including a booting controller for generating the booting permission signal in response to an initializing signal, according to whether the password is valid and whether the hard disk is the hard disk which is initially installed in the system, an encrypting/decoding portion for encrypting/decoding data in response to a disk input/output requesting signal, in accordance with whether or not the disk input/output requesting signal is from a hard disk and in accordance with whether the operating mode is a reading or writing mode, and a storing portion for storing a boot sector with partition and password, and a central controller for controlling the hard disk and the security device, generating the initializing signal when power is supplied thereto and the disk input/output requesting signal in response to a signal input to the input/output device, and controlling various data stored in the security device, and the hard disk is booted in response to whether the security device exists and whether the security device is the security device which is initially installed in the system.

1 Claim, 7 Drawing Sheets

METHOD OF DETACHING A SECURITY DEVICE FROM A PERSONAL COMPUTER

This is a divisional of application Ser. No. 08/682,280, filed Jul. 17, 1996, now U.S. Pat. No. 5,884,026.

BACKGROUND OF THE INVENTION

The present invention relates to a personal computer (PC), and more particularly, to a PC having a security function, a security method therefor, and methods of installing and detaching a security device in and from the PC.

Currently, PC's are being used by many different kinds of people for various applications, some of which involve highly sensitive information. Thus, PC's have provided users with various measures for securing such information.

A PC security method has three aspects: a first aspect of preventing an unauthorized user from booting the PC; a second aspect of preventing the usage of input devices such as a keyboard or mouse; and a third aspect of preventing valuable information from being read and copied.

The above security method generally requires a user to input a password for permitting the use of PC. However, if the password is revealed, the conventional PC protection function is useless.

Furthermore, it is not difficult for an unauthorized user who doesn't know the password to find it on a hard disk. Thus, an unauthorized user can copy valuable information from the booted PC without permission, thereby exposing information. Also, even if the PC includes the security device, it may be detached from the PC by an unauthorized user and the hard disk thereof may be accessed to expose information.

SUMMARY OF THE INVENTION

To solve the problems, it is an object of the present invention to provide a PC having a security function, which stores a password therein and controls the booting of the PC, wherein since only this PC can decode encrypted information, security can be guaranteed even if an unauthorized user copies information stored in the PC without permission.

It is another object of the present invention to provide a PC security method for controlling the booting of the PC.

It is still another object of the present invention to provide a PC security method where information stored in the PC is encrypted to prevent it from being decoded by another PC, thereby securing information even if it is copied from the PC without permission.

It is yet another object of the present invention to provide a PC security method where a password is stored in the PC.

It is a further object of the present invention to provide a method for installing a security device in the PC.

It is a still further object of the present invention to provide a method for detaching a security device from the PC.

According to an aspect of the present invention, there is provided a personal computer having a securing function comprising: an input/output portion for inputting/outputting a password; a main memory portion for storing the password; a hard disk for storing the password and a boot sector without partition, which is booted in response to a booting permission signal; a security portion including a booting controller for generating the booting permission signal in response to an initializing signal, according to whether the password is valid and whether the hard disk is the hard disk which is initially installed in the system, an encrypting/decoding portion for encrypting/decoding data in response to a disk input/output requesting signal, in accordance with the type of a disk or diskette and operation mode such as reading and writing, and a storing portion for storing a boot sector with partition and password; and a central controller for controlling the hard disk and the security portion, generating the initializing signal when power is supplied thereto and the disk input/output requesting signal in response to a signal input to the input/output portion, and controlling the various data stored in the security portion, wherein the hard disk is booted in response to whether the security portion exists and whether the security portion is the security portion which is initially installed in the system.

According to another aspect of the present invention, there is provided a personal computer security method for controlling the boot of the personal computer including a hard disk and security portion for storing various programs for security of the personal computer, the security method comprising the steps of: (a) preventing the booting of the personal computer if a password input by a user is not valid; (b) terminating the booting of the personal computer if the security portion is detached; (c) controlling the input/output of data to/from the hard disk using the security portion if the security portion is that which is initially installed in the PC together with the hard disk; and (d) booting the hard disk.

According to still another aspect of the present invention, there is provided a personal computer security method for preventing information stored in a personal computer from being accessed by an unauthorized user, the personal computer including a hard disk and security portion for controlling the input/output of data to/from the hard disk, comprising the steps of: (a) determining whether the type of a disk to/from which the user intends to input/output data is a hard disk; (b) determining whether to read information from a diskette if the disk is not a hard disk; (c) decoding information written on the diskette if the information written on the diskette is corresponds to encrypted information stored in the hard disk to supply the decoded signal to a user; (d) determining whether to write information on the diskette if it is determined not to read information from the diskette in step (b); (e) writing information on the diskette after encrypting data so as to be decoded only by the security portion if it is determined to write information on the diskette; and (f) performing a disk interrupt operation initiated by the personal computer if it is determined not to record information on the diskette in step (d) or it is determined in step (a) that the type of a disk to/from which the user intends to input/output data is a hard disk.

According to yet another aspect of the present invention, there is provided a personal computer security method for storing the password of a personal computer, wherein the personal computer includes a hard disk, input/output portion, main memory portion and security portion for securing the personal computer in any portion in/from which data can be written/read.

According to a further aspect of the present invention, there is provided a method of installing a security device in a personal computer, comprising the steps of: installing the security device in the hard disk and the central controller of the personal computer; storing an original booting data of the boot sector of the hard disk in a special file; installing new booting data in the boot sector; copying the new booting data installed in the boot sector into the security device; removing only a partition from the new booting data so as to prevent the personal computer from being used without the security device; and registering the password and identification number of the personal computer in the hard disk and the security device.

According to a still further aspect of the present invention, there is provided a method of detaching a security device from a personal computer, wherein the method is performed by installing again original booting data stored as a special file in the boot sector of the personal computer and allowing only an authorized user to remove the password.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
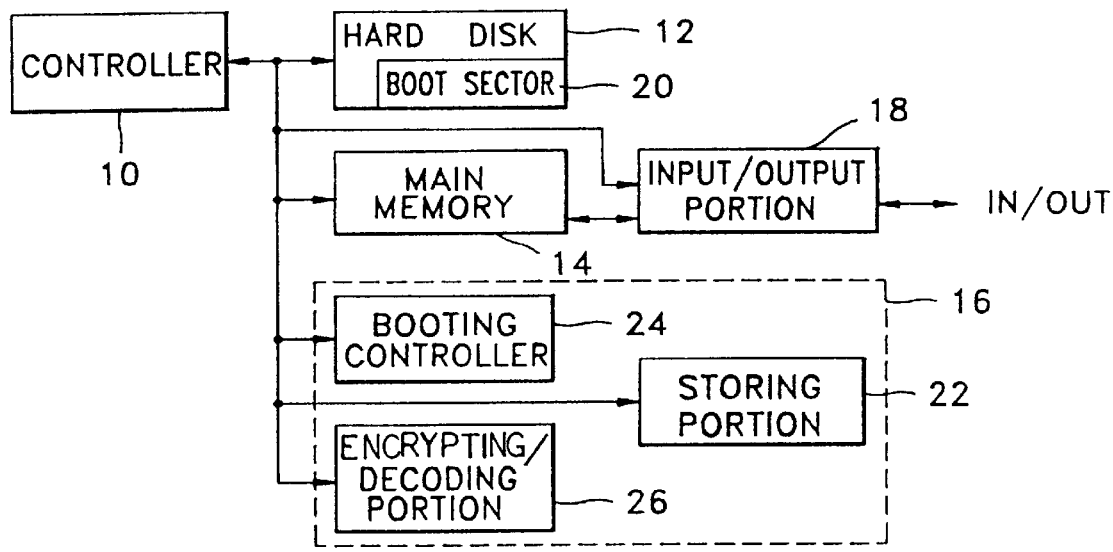
FIG. 1 is a block diagram of a PC having a security function according to the present invention.

As shown in FIG. 1, a PC having a security function according to the present invention is comprised of a controller 10, a hard disk 12, a main memory 14, a security portion 16 and an input/output portion 18, wherein the security portion 16 further comprises a booting controller 24, an encrypting/decoding portion 26, and a storing portion 22 which can be realized using an electrically erasable programmable ROM (EEPROM).

The controller 10 controls the hard disk 12 and the security portion 16 and generates an initializing signal when power is supplied thereto and a disk input/output requesting signal in response to a signal input to the input/output portion 18. Also, the controller 10 controls the storage of various data in the security position 16. The hard disk 12 stores a password and a boot sector 20 without partition therein, and is booted in response to a booting permission signal, and the main memory 14 is for storing the password.

In the security portion 16, the booting controller 24 generates the booting permission signal in response to an initializing signal, according to whether the password is valid and whether the hard disk 12 is the hard disk which is originally installed in system. The encrypting/decoding portion 26 encrypts/decodes data in response to a disk input/output requesting signal, in accordance with the type of disk or diskette and operation mode such as reading and writing. Also, the storing portion 22 stores the password and the boot sector with partitions. The input/output portion 18 can input and output passwords therein and therefrom, respectively.

Here, the controller 10, the hard disk 12, the main memory 14, and the input/output portion 18 which are general devices for constructing the PC are connected to each other through a bus via corresponding adaptors.

According to the PC of the present invention, a program for controlling booting is stored in the boot sector of the hard disk 12, and a program for security is stored in the storing portion 22 of the security portion 16. The programs for booting control and security perform a procedure of verifying each other for a perfect security. That is, if one of the program fails to verify the existence of the other program, the PC cannot be booted.

The storing portion 22 of the security portion 16 can be read from and written to by a microprocessor, so that a user password, a copy of the boot sector 20 of the hard disk 12, and a program which is actively or passively operated for security can be stored therein. That is, even if an unauthorized user boots the PC using another floppy disk after removing the security portion 16, the hard disk 12 can not be used since partition information of the hard disk 12 is stored only in the storing portion 22 of the security portion 16.

Figure 2:
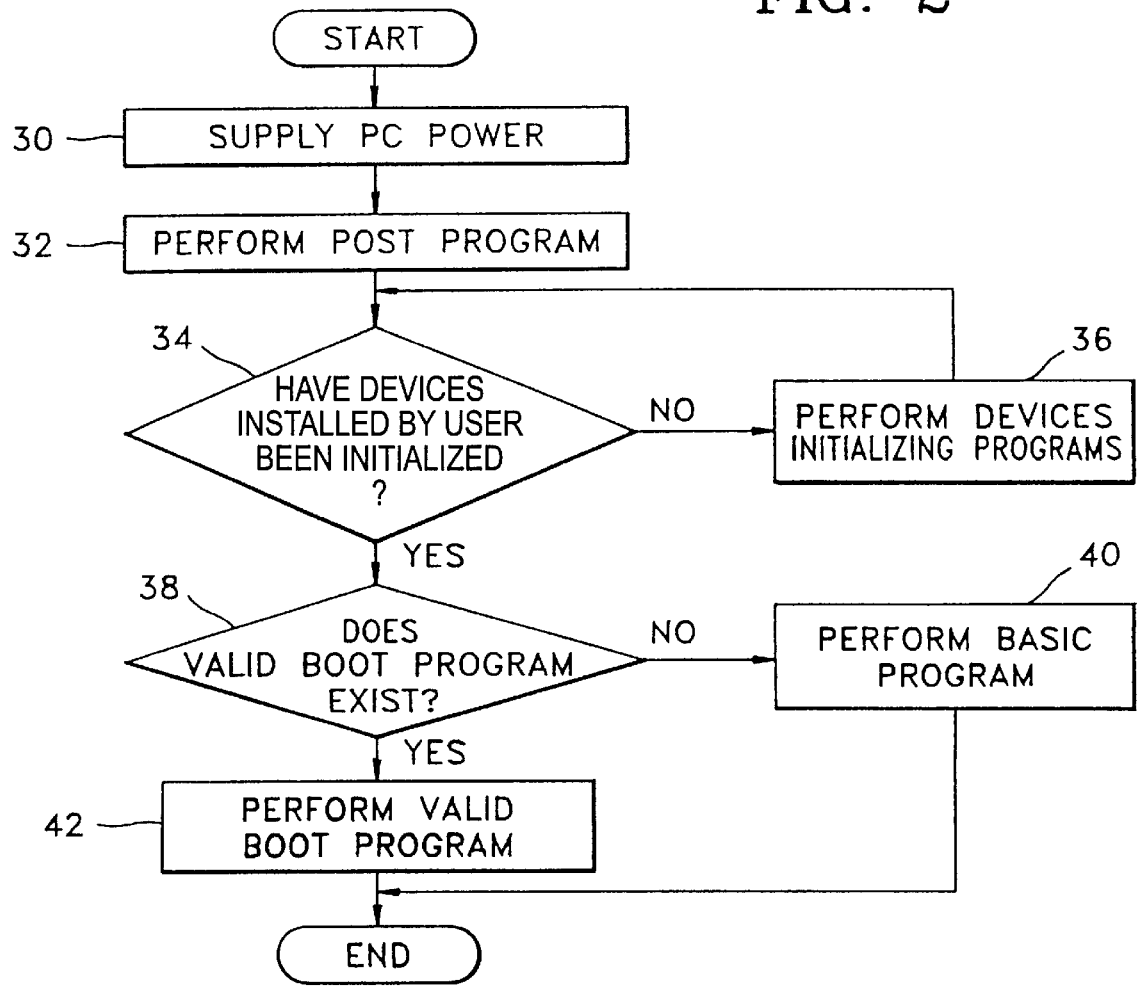
FIG. 2 is a flowchart illustrating a general booting procedure of a PC.

Referring to FIG. 2, a general booting procedure of the PC will be described in detail.

When power is supplied to the PC (Step 30), the PC performs a power on self-test (POST) for testing its various internal elements and for an initialization (Step 32). The POST program for Step 32 is stored in a ROM of the main memory 14. After Step 32, the PC determines whether or not devices optionally installed in the PC by the user have a respective execution program in a predetermined range of addresses. If the execution program exists, it is determined whether or not the corresponding device is initialized (Step 34). If the initialization is not performed, the corresponding device is initialized by the PC all over the predetermined address range (Step 36). After the initializing programs of the devices having boot programs have been performed, the PC starts to perform a booting procedure. After completely checking to see which devices have a boot program, it is determined whether a valid boot program exists in each device (Step 38). If the valid boot program does not exist, the PC performs a BASIC programs stored in the ROM of the main memory 14 (Step 40). However, if the valid boot program exists, each valid boot program of the devices is performed (Step 42).

Figure 3:
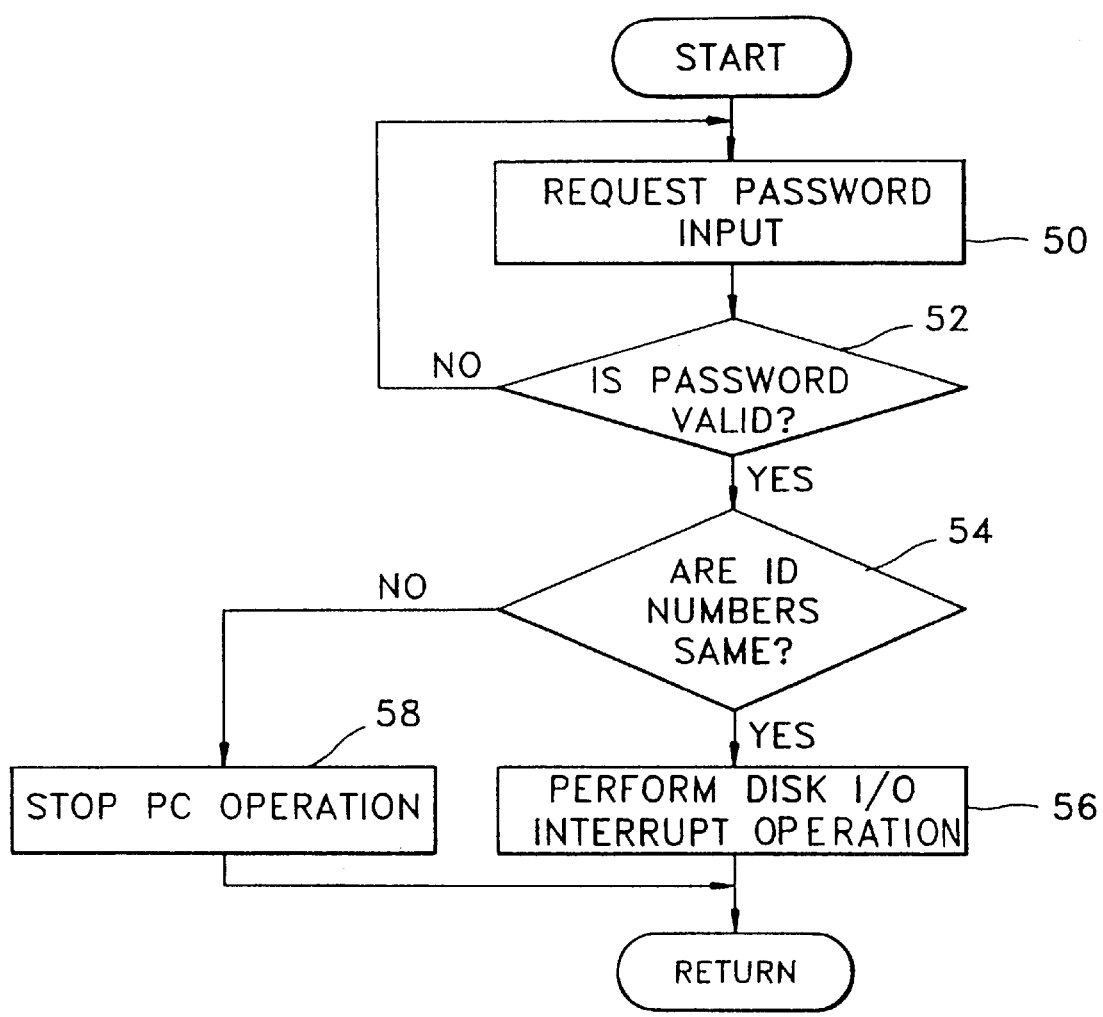
FIG. 3 is a flowchart illustrating a method for controlling the booting of the PC according to the present invention.

The method for initializing the security portion 16, performed in Step 36 of FIG. 2, that is, a method for controlling the booting of the PC, will be described with reference to FIG. 3.

The PC requests a user to input a password (Step 50). Then, the booting controller 24 determines whether the password input from the user is valid (Step 52). Here, the password can be selectively stored wherever data can be written and read. That is, the password may be stored in the hard disk 12, the storing portion 22 of the security portion 16, a floppy diskette, a non-volatile memory, a terminal connected to the PC and/or a card reader.

In Steps 50 and 52, the password is continuously requested if the input password is not valid, so that the booting of the PC is held at a first security step. If it is determined that the password is valid in Step 52, the PC compares its own identification (ID) number of the security portion 16 with a corresponding ID number stored in the boot sector 20 of the hard disk 12, to verify whether the PC is the same as the PC in which it was initially installed (Step 54). If the ID number of the security portion 16 does not match the number in the boot sector 20 or does not exist in the boot sector 20, the operation of the PC is terminated (Step 58). Steps 54 and 58 are the second security steps for preventing the installed security portion 16 from being detached from the PC or the PC from being booted by another replaced hard disk. If the condition of Step 54 is satisfied, the security portion 16 performs an interrupting operating during the disk I/O interrupt (Step 56). Step 56 is for preventing the data stored in the PC from being copied without permission by an unauthorized user using an auxiliary memory device.

Figure 4:
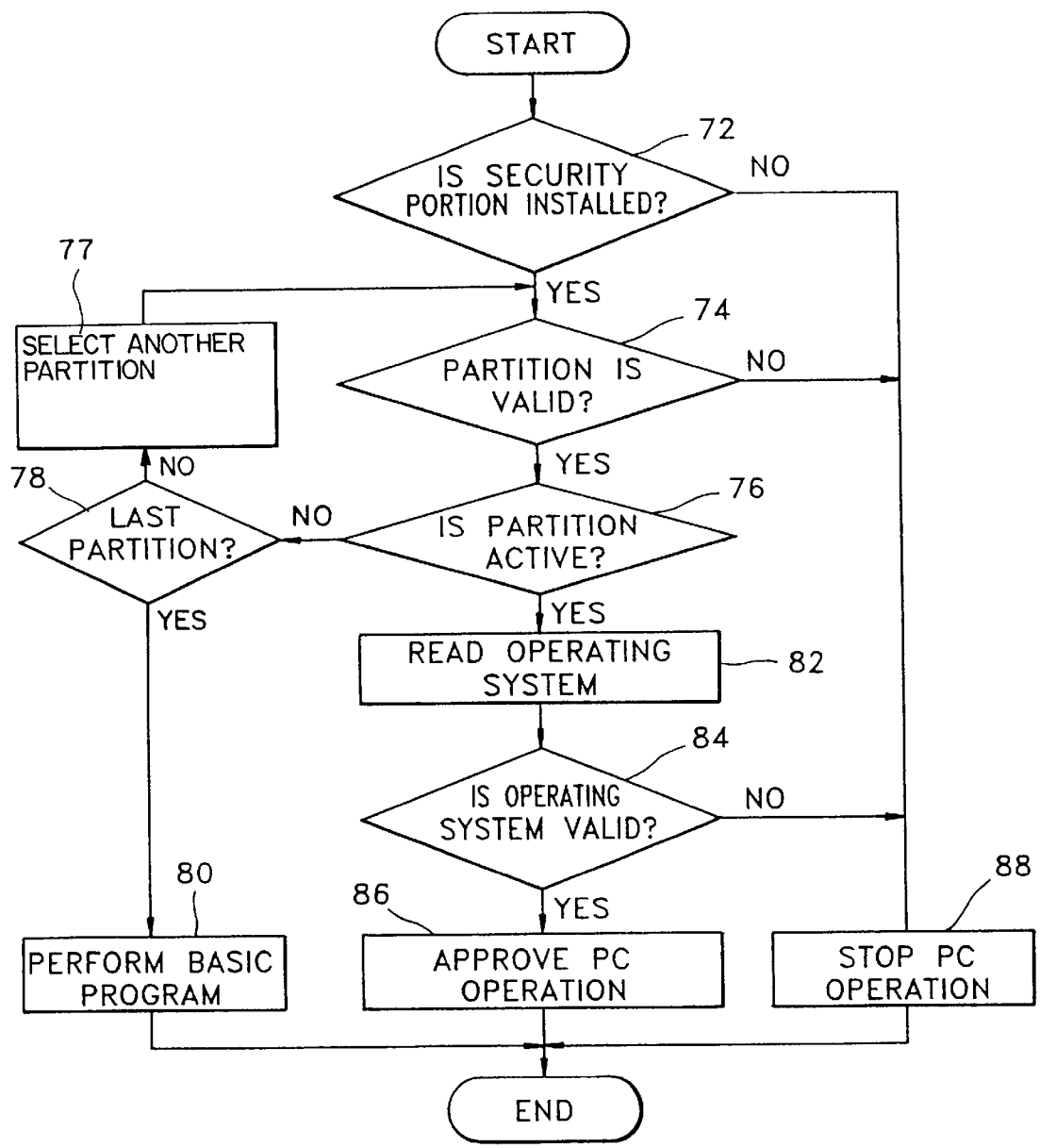
FIG. 4 is a flowchart illustrating step 42 of FIG. 2.

Step 42 of FIG. 2 will be described with reference to FIG. 4 as follows.

First, the controller 10 checks to see whether the security portion 16 is installed in the PC (Step 72). If the security portion 16 has been removed from the PC, the operation of the PC is terminated (Step 88). Otherwise, it is determined whether a partition stored in the storing portion 22 of the security portion 16 is valid (Step 74). If the partition is not valid, the operation of the PC is terminated (Step 88). However, if the partition is valid, it is determined whether the partition is active or not (Step 76). If a partition is valid but not active, it is then determined whether or not it is the last partition of the hard disk 12 (Step 78).

Here, a partition able to read data and a partition having an operating system are named as "valid partition" and "active partition", respectively. For example, a hard disk may be divided into several drives. Here, supposing that the hard disk is divided into four drives, each drive corresponds to a partition, and a drive having the operating system corresponds to the active partition.

If the current partition is determined to be the last one, that is, if there is no active partition, a BASIC program is performed (Step 80). If the current position is not determined to be the last one, another partition stored in the security portion is selected (Step 77).

On the other hand, in Step 76, if the partition is active, the operating system is read therefrom (Step 82) and then it is determined whether or not the operating system is valid (Step 84). Here, if the operating system is not valid, the operation of the PC is terminated (Step 88). On the contrary, if the operating system is valid, control of the PC is transferred to the valid operating system (Step 86).

A method of making the information, which is copied without permission, useless when the disk I/O interrupt, that is, the disk I/O command, is input, will be described with reference to FIG. 5 as follows.

When the operating system processes an operation in accordance with a command from a user upon receiving operational control of the PC after it has been booted in a normal manner, if the disk I/O command is input from the input/output portion 18 shown in FIG. 1, the controller 10 processes the disk I/O interrupt via the encrypting/decoding portion 26 as follows.

First, the type of disk which a user intends to use is examined (Step 90). As a result, if the disk is a floppy diskette and not the hard disk 12, it is determined whether to read information from the floppy diskette (Step 92). If the condition of Step 92 is satisfied, information is read from the floppy diskette and then decoded if the information stored on the floppy diskette corresponds to the encrypted information stored in the hard disk 12 (Step 94). On the other hand, if the condition of Step 92 is not satisfied, it is determined whether to write information on the diskette (Step 96). Then, if it is determined in Step 96 to write information on the disk, the data to be written is encrypted before being written (Step 98). Also, if the disk is a hard disk or if information is neither read from nor written to the diskette, the PC performs the disk input/output interrupt according to the conventional method (Step 100).

Figure 5:
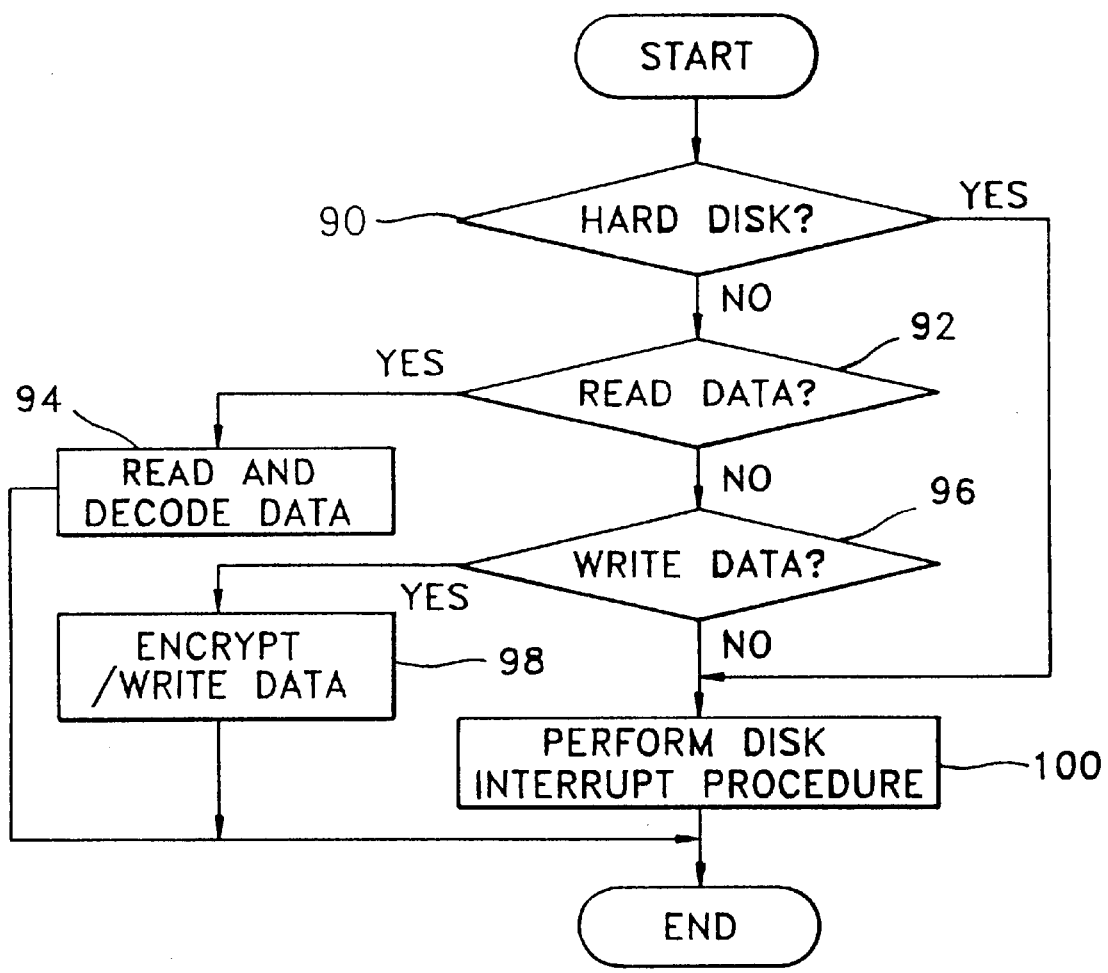
FIG. 5 is a flow chart illustrating a method for making the information, which is copied without permission, useless when a disk input/output command is input, according to the present invention.
Figure 6A:
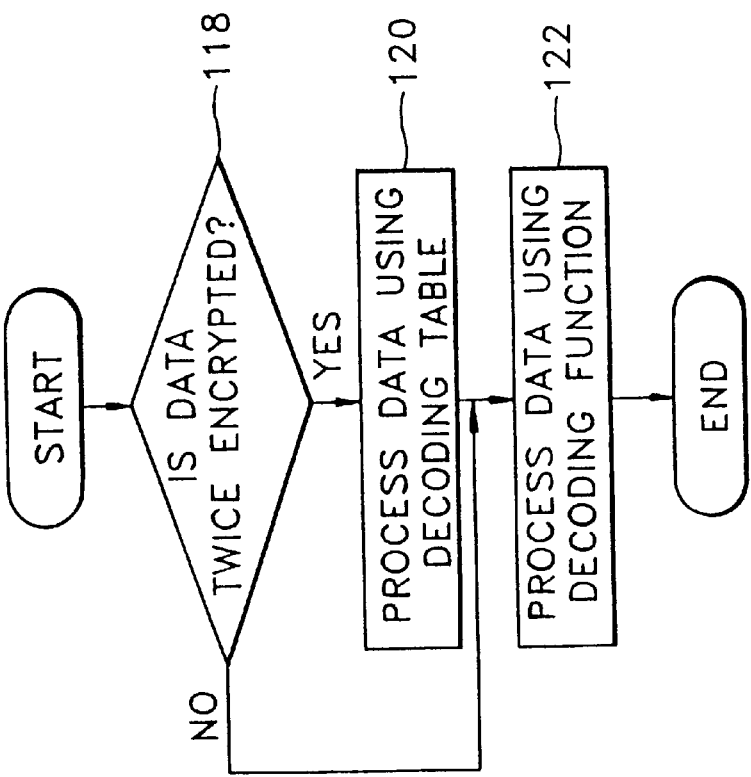
FIGS. 6A and 6C are flowcharts illustrating methods for encrypting and decoding information according to the present invention.
Figure 6B:
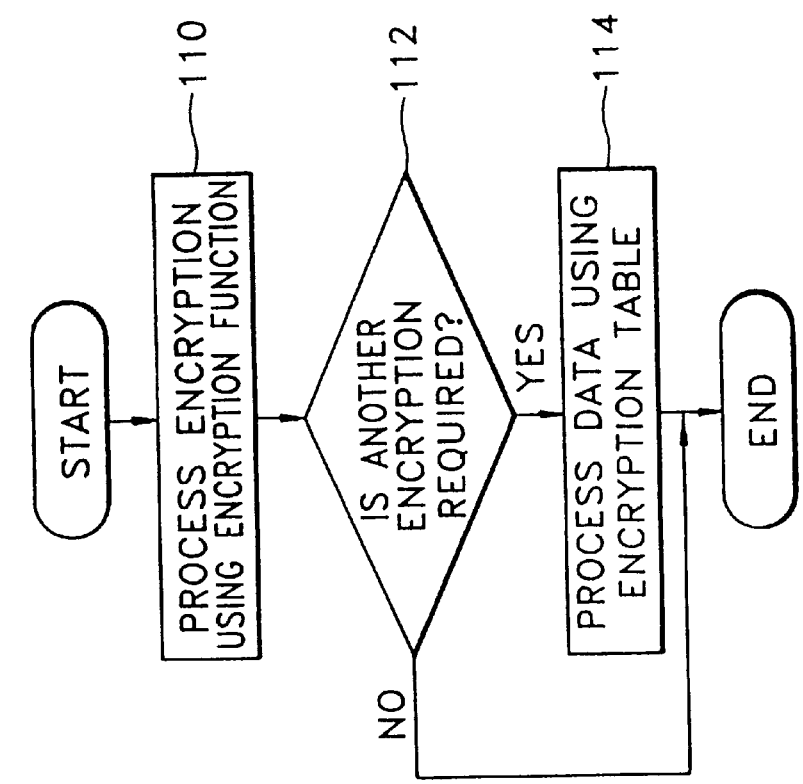
Figure 6C:
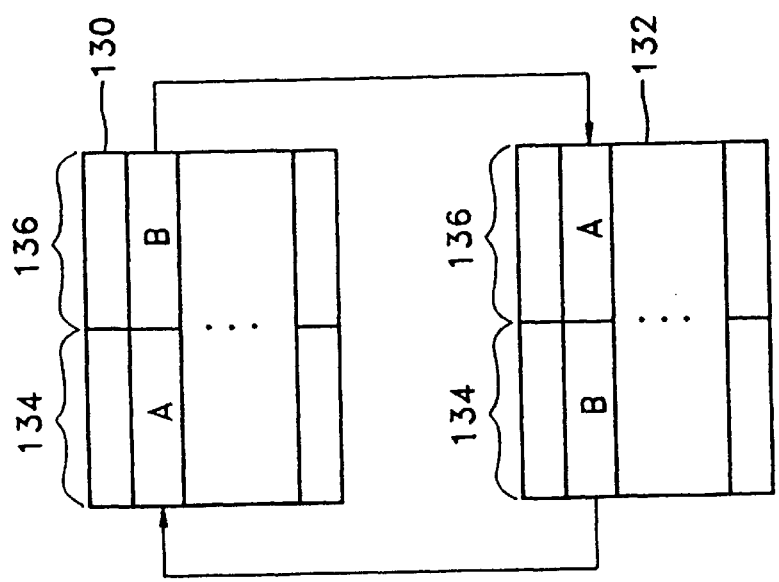

FIG. 6A is a flowchart illustrating Step 98 of FIG. 5 for encrypting the data according to the present invention, FIG. 6B is a flowchart illustrating Step 94 of FIG. 5 for decoding the encrypted data according to the present invention, and FIG. 6C is a diagram illustrating a table processing, which is used in the encrypting and decoding steps of the present invention. The encrypting and decoding of the data according to the present invention are performed by two steps of the functional processing and table processing. Here, if required, further steps may be included.

In FIG. 6A, user data is encrypted (Step 110). Then, the PC determines whether to encrypt the data once more (Step 112). If the condition of Step 112 is satisfied, the encrypted value is processed through a process using the table for encryption (Step 114).

In FIG. 6B, the decoding process is performed in the reverse order of the encryption, the PC determines whether the data is encrypted once or twice (Step 118). If the data is encrypted twice, the encrypted data is processed using a decoding table (Step 120). If the data is encrypted once or the encrypted data is processed using the decoding table, the data is processed using a decoding function after Step 120 (Step 122) to restore the data to its original non-encrypted form. On the other hand, if the data is encrypted only once the decoding table process (Step 120) is skipped and the decoding function process is performed (Step 122), thereby ending the procedure.

Here, in order to perform the decoding and encrypting processes within an identical PC, the encrypting/decoding portion 26 of FIG. 1 stores two tables 130 and 132 as shown in FIG. 6C. In FIG. 6C, reference numeral 134 represents constituent elements of the encrypting and decoding tables, and reference numeral 136 represents index values corresponding to the constituent elements.

The constituent elements of each table 130 and 132 have a one to one correspondence. That is, a constituent element "A" of the table 130 for encryption faces a constituent element "B" of table 132 for decoding. Thus, during encryption, content (B) of a corresponding position in table 130 for encryption is output as an encrypted value with respect to an input value (A). Thus, when the data to be decoded during the decoding process is (b), the value (A) of the decoding table 132, corresponding to the constituent element (B), is output as the initial data before the encryption.

Figure 7:
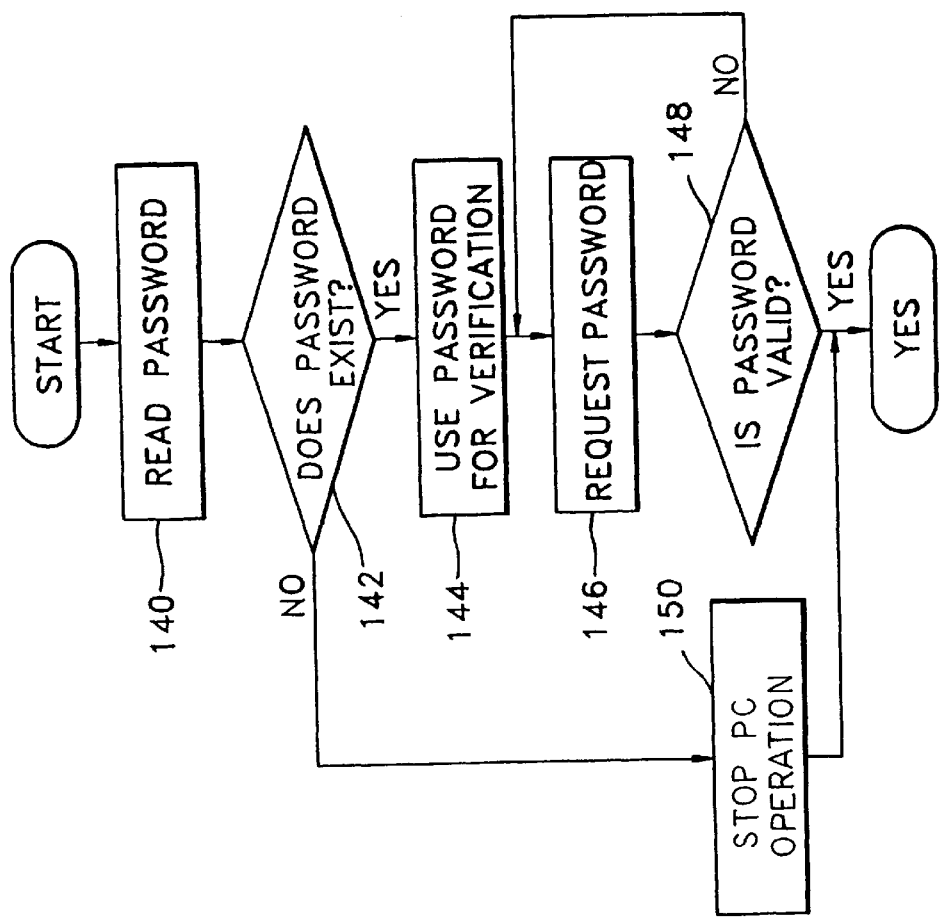
FIG. 7 is a flowchart illustrating a method for verifying whether a password input by a user is the same as the password stored in the PC, according to the present invention.

A method of verifying whether the user's password is the same as the password stored in the PC will be described with reference to FIG. 7.

The process of comparing the user's password with the password stored in the PC has been described together with the method of controlling the booting operation of the PC. This comparison process is performed during the operation related with the security portion 16, such as the booting and installing operations.

First, the controller 10 reads a portion where the password is stored (Step 140), and then, it is checked whether the password exists in a designated portion (Step 142). If the password does not exist in the designated position, the operation of the PC is terminated (Step 150). On the contrary, if the password does exist in the designated position, the password is taken from the position where it is stored (Step 144). Then, the booting controller 24 requests the user to input the password (Step 146) and it is then determined whether the password of the user is valid (Step 148). If the user's password is valid, the password verification step is completed. Otherwise, the booting controller 24 continuously requests the password from the user (Step 146).

Figure 8B:
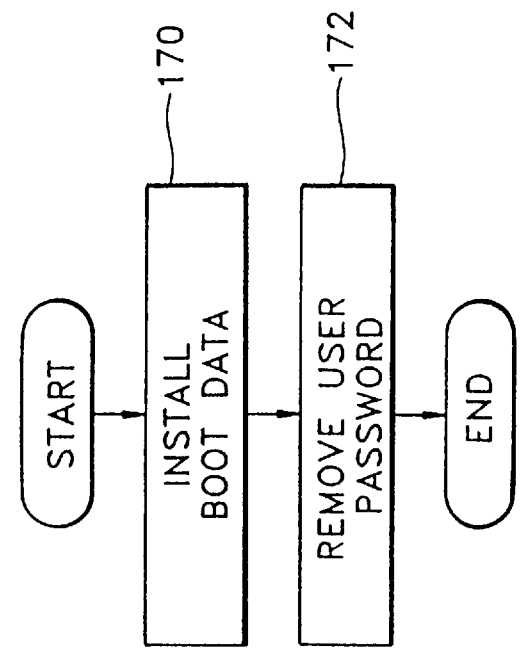
FIG. 8B is a flowchart illustrating a method for detaching the security device from the PC according to the present invention.
Figure 8A:
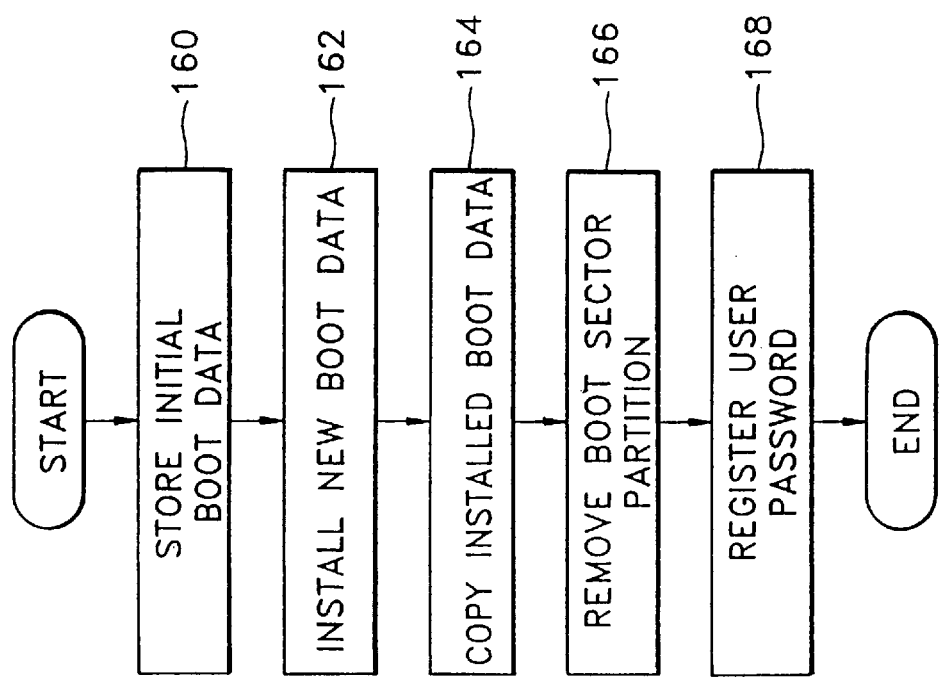
FIG. 8A is a flowchart illustrating a method for installing a security device in the PC according to the present invention.

The methods for installing and detaching the security portion 16 will be described with reference to FIGS. 8A and 8B.

When the installation of the security portion 16 is initiated, the initial boot data stored in the boot sector 20 of the hard disk 12 is separately stored in the form of a file (Step 160), and then, a new boot data given in the form of a file is stored in the boot sector 20 of the hard disk 12 for security (Step 162). Next, the changed contents of the boot data of the hard disk 12 are copied in the storing portion 22 of the security portion 16 (Step 164). Thereafter, the partition of the boot sector 20 stored in the hard disk 12 is removed (Step 166) to prevent the system from being used without any security device. Then, the password and the identification number of the PC are registered in the hard disk 12 and storing portion 22 (Step 168), thereby completing the installation of the security portion 16.

The detaching operation of the security portion 16 is permitted only for an authorized user. First, the special file having the initial booting data is installed in the boot sector 20 of the hard disk 12 (Step 170) to return the boot sector 20 to the initial state. Then, the password stored in the storing portion 22 is removed (Step 172), thereby completing the detaching operation of the security portion 16.

As described above, according to the PC having a security function, the security method therefor, and the methods for installing and detaching a security device of the present invention, the security is maintained through two steps: first, the password is stored in the PC, and second, the PC is booted only after determining whether the password is valid and the security device exists. Thus, an unauthorized user who doesn't know the password cannot boot the PC and the hard disk cannot be used without the security device even if the PC is booted using a floppy diskette, thereby providing triple security protection. Also, a file copied by an unauthorized user cannot be read by another PC since the file is encrypted.

What is claimed is:

1. A personal computer having a security function comprising:

input/output means for inputting/outputting a password;

main memory means for storing the password;

a hard disk for storing the password and a boot sector without partition, which is booted in response to a booting permission signal;

security means including a booting controller for generating the booting permission signal in response to an initializing signal, according to whether the password is valid and whether said hard disk is the hard disk which is initially installed in system, an encrypting/decoding portion for encrypting/decoding data in response to a disk input/output requesting signal, in accordance with whether or not the disk input/output requesting signal is from a hard disk and in accordance with the operation mode such as reading and writing, and a storing portion for storing a boot sector wit partition and password; and a central controller for controller said hard disk and said security means, generating said initializing signal when power is supplied thereto and the disk input/output requesting signal in response to a signal input to said input/output means, and controlling various data stored in said security means, wherein said hard disk is booted in response to whether said security means exists and whether said security means is the security means which is initially installed in the system.

\* \* \* \* \*